United States Patent [19]
Schön

[11] 3,718,158
[45] Feb. 27, 1973

[54] ACCUMULATOR CONTROL SYSTEM

[75] Inventor: Otmar Schön, Scheidterberg, Germany

[73] Assignee: Greer Hydraulics Inc., Los Angeles, Calif.

[22] Filed: Oct. 13, 1971

[21] Appl. No.: 188,794

[30] Foreign Application Priority Data

Oct. 28, 1970 Germany .................... P 20 52 892.1

[52] U.S. Cl. .................... 137/593, 137/608, 137/568
[51] Int. Cl. ............................................. F16l 55/04
[58] Field of Search ...... 137/593, 567, 568, 608, 571, 137/270, 271

[56] References Cited

UNITED STATES PATENTS

| | | | |
|---|---|---|---|
| 2,966,168 | 12/1960 | Hunt et al. | 137/270 |
| 2,882,867 | 4/1959 | Thompson | 137/568 X |
| 3,044,481 | 7/1962 | Regan | 137/571 X |
| 2,551,274 | 5/1951 | MacDuff | 137/608 X |
| 3,653,395 | 4/1972 | Chapman | 137/568 X |
| 2,919,715 | 1/1960 | Rockwell | 137/568 X |
| 3,590,867 | 7/1971 | Tam et al. | 137/568 |
| 3,288,166 | 11/1966 | Wagner | 137/568 X |

Primary Examiner—Henry T. Klinksiek
Assistant Examiner—Ira S. Lazarus
Attorney—Arthur B. Colvin

[57] ABSTRACT

A pressure accumulator control system comprising a mounting block having a port to which the liquid port of the accumulator which is desirably mounted on the block may be connected, a pressure port and a discharge port, said block having a passageway connecting the first port to the pressure port with a manually operable shutoff valve in said passageway, a second passageway in communication with said first port, an automatically operable valve mounted on said block controlling communication between said first port and said discharge port, a pressure relief valve also mounted in said discharge passageway and a manually operated relief valve controlling flow between a relief passageway connecting said first passageway and the discharge passageway, said pressure port having an associated one-way valve with means to control the opening of said valve.

6 Claims, 2 Drawing Figures

ACCUMULATOR CONTROL SYSTEM

It is among the objects of the invention to provide a pressure accumulator control system including a control block on which the pressure accumulator may be mounted, which system is compact and may readily be fabricated at low cost and which will provide in one integral package suitable valving and safety features to permit normal operation of the hydraulic system connected to the control system and which will also permit automatic relief of the accumulator in the event of power failure to prevent inadvertent actuation of the system and will permit cut off and drainage of the accumulator when required for service, which control system is not likely to be deranged with long use due to the substantial elimination of pipes or conduits between the control valves.

According to the invention these objects are accomplished by the arrangement and combination of elements hereinafter described and more particularly recited in the drawing.

In the accompanying drawing in which is shown one of various possible embodiments of the several features of the invention;

Figures 1, 2:
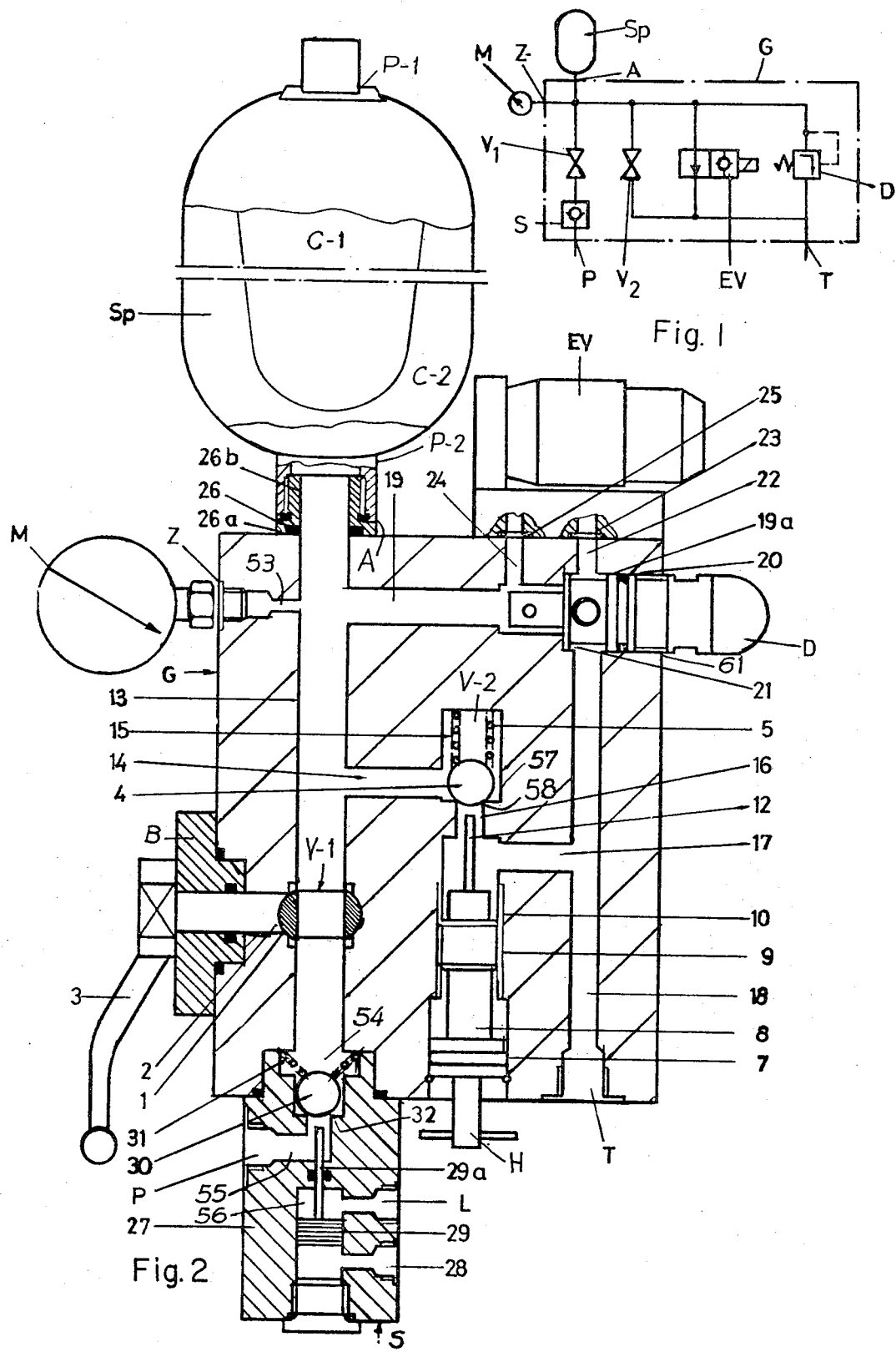
FIG. 1 is a diagrammatic view of the control system.
FIG. 2 is a sectional view of the control system.

Referring now to the drawings, the pressure accumulator control system comprises a control block G on which the accumulator Sp is mounted.

The accumulator desirably comprises a pressure resistant vessel illustratively a rigid shell having opposed ports P-1, P-2 and a partition, preferably a bladder of resilient deformable material is positioned in the shell dividing the latter into two chambers C-1 and C-2 for gas and liquid respectively in communication with the ports P-1 and P-2 respectively.

The chamber C-1 is adapted to be charged with gas under pressure through port P-1 and the chamber C-2 is adapted to be charged with fluid such as oil under pressure through port P-2. As the pressure accumulator may be of any conventional type, such as for example, that shown in U.S. Pat. No. 3,439,712, it will not be further described, except as is necessary for an understanding of the invention.

As shown in FIGS. 1 and 2, the block G has a mounting position A for the accumulator. It has a port T to be connected to a reservoir; a port Z to which a pressure gauge M may be connected and a port P to which a source of fluid such as oil may be connected and which also is connected to the hydraulic system to be operated.

Referring to FIG. 2, the block G has a bore 13 therethrough, the upper end of which has an externally threaded sleeve 26 secured thereto as by welding, said sleeve having a flanged end 26a secured to the block G and an outwardly extending threaded portion which mounts the tubular fitting 26b of the accumulator Sp is secured, said tubular fitting defining a fluid port of the pressure vessel, which is in communication with the bore 13. A transverse bore 53 extends from bore 13 to the port Z to which the pressure gauge M is secured. Positioned in the bore 13 is a shutoff ball valve V-1 having a spherical ball member 1 to which a shaft 2 is secured, the latter extending transversely out of the block G through a suitable oil tight bearing B and an operating handle 3 being mounted on the shaft to control the ball element 1. The lower end 54 of bore 13 mounts a hollow fitting 27 which is screwed into an internally threaded opening in such lower end 54 of bore 13. The fitting 27 has a one-way valve S in the form of a ball 30 retained on its seat 32 by a coil spring 31. The fitting 27 has a passageway 55 in communication at one end with the valve seat 32 and at its other end with the port P. In order to release the ball 30 during the start up of the system, an operating pin 29a is provided, one end of which is adapted to abut against the ball 30 and the other end of which mounts a piston 29 slidably mounted in a piston chamber 56. One end of the chamber is in communication with a port L and the other end of the chamber is in communication with the port 28. Extending transversely from the bore 13 between valve V-1 and bore 53 is a passage 14 which leads into a longitudinal bore 57 extending parallel to bore 13. The bore 57 has an upper chamber 15, the lower end of which defines a seat 58 and the ball 4 of one-way valve V-2, the ball being retained on its seat by coil spring 5.

Positioned in the lower portion of bore 57 is a screw element 8 having a sealing ring 7. The screw element 8 is retained in the lower portion of bore 57 by coacting threads 9 and 10. When the screw element 8 is operated by turning handle H, the pin 12 will push against ball 4 to move the latter off its seat 58 to connect the ball or passageway 13 leading to the accumulator Sp, through transverse passageway 14 and open valve seat 58 into chamber 16 beneath the seat 58 and then via transverse passageway 17 to longitudinal passageway 18 leading to port T to discharge the accumulator. From the passageway of bore 13 there extends an additional transverse passageway 19 which extends through the wall of the block G as at 61 and which mounts a screw in pressure limiting valve D having a body portion 19a. The annular groove 21 of the valve D is aligned with the longitudinal passageway 18 and with a passageway 22 to a port 23. The transverse passageway 19 is connected by a passageway 24 to a port 25.

Mounted on the block G is a solenoid operated shutoff valve EV which illustratively is a two-way valve that may be hydraulically or pneumatically operated and which is in communication with the ports 23 and 25.

On energization of valve EV, flow of fluid through the valve EV is blocked and on de-energization of the valve EV illustratively when no current is passing through the solenoid which operates the same, the valve EV is switched to open position. As a result, the accumulator Sp is connected to the reservoir through passage 13, transverse passage 19, connecting passageway 20, open valve EV, connecting passage 22, annular space 21 and passage 18 which leads to port T.

During operating of the hydraulic system (not shown) which is connected to the port P, the shut-off valve V-1 and the releasable non-return valve S including the ball valve 30 are opened while the two shutoff valves V-2 and EV are closed.

When the system is shut off, the electrically operated shutoff valve EV returns to its open position so that the accumulator Sp is discharged through the port T to the reservoir. At the same time the releasable non-return valve S will close. As a result, return flow of the liquid under pressure in accumulator S$p$ into the system is effectively prevented.

By reason of the valve V-1, the accumulator can be manually cut off from the hydraulic system which is required in case of repair or checking of the system in order that no fluid from the accumulator flow into the system.

The shutoff valve V-2 serves to connect and disconnect respectively the accumulator from the discharge reservoir and this valve is required when repairing or checking the system in order to discharge the hydraulic pressure from the accumulator, the valves V-1, V-2 being manually operable.

The safety valve D located between the accumulator and the reservoir is connected parallel to the shutoff valves V-1, V-2 and protects the accumulator against excessive pressure in the system when the valve V-1 is opened and against excessive pressure increase in the accumulator when the valve V-1 is closed due to ambient conditions such as temperature increase.

In addition, the electrically or pneumatically operated shutoff valve EV, which has an open and closed position, is connected parallel to the valve V-1. During operation of the system, the valve EV is closed. In case of current failure the valve EV opens so that the accumulator is connected to the discharge reservoir and the stored pressure in the accumulator can be relieved. Consequently, there is no energy in the system and none of the hydraulically controlled equipment can operate inadvertently which might cause damage to the equipment or danger to the operating personnel.

The releasable non-return valve system is connected in series with the valve E-1 and the valve S is hydraulically or pneumatically operated by a suitable source connected to port 28 and serves for connecting or disconnecting the accumulator from the hydraulic system mounted to the port P as the operating conditions require.

With the unique system above described, considerably less space is required for the various valves employed and due to the elimination of pipes or tubes being the individual elements, leakage due to vibration is minimized.

Having thus described my invention, what I claim as new and desire to secure by Letters Patent of the United States is:

1. A pressure accumulator or system comprising a block having a port to which the pressure accumulator may be connected and a pressure port, a first passageway connecting said ports, a manually operated shutoff valve in said passageway, a discharge port, a second passageway connecting said first passageway to said discharge port, a manually operated control valve in said second passageway to connect said accumulator directly to said discharge port, a third passageway between said first passageway and said discharge port, a relief port in said block having a pressure relief valve mounted therein and controlling flow of fluid from said first passageway through said third passageway to pressure port.

2. The combination set forth in claim 1 in which said block has a pair of passageways defining a bypass for said pressure relief valve, said block having a pair of ports in communication with said passageway and an automatically operated shutoff valve is operatively connected to said pair of ports whereby when said valve is in closed position said bypass ports will be disconnected and when said valve is in open position said pair of passageways will be connected to directly connect the accumulator to the discharge port.

3. The combination set forth in claim 2 in which said automatically operated valve is electrically actuated and said valve is in open position when the current flow to the valve is cut off.

4. The combination set forth in claim 1 in which a one-way valve controls flow of fluid from said accumulator through said first passageway to said pressure port, said one-way valve being normally urged to closed position to cut off flow from said accumulator to said pressure port and means are provided to open said one-way valve.

5. The combination set forth in claim 4 in which said one-way valve comprises a hollow fitting having a valve seat, a ball valve is positioned on said seat, resilient means reacting against said ball normally to retain the latter on said seat, said valve seat being interposed between said first passageway and said discharge port and an actuating member is provided movable against said ball to move the latter off its seat.

6. The combination set forth in claim 4 in which said one-way valve comprises a hollow fitting having a valve seat, a ball valve is positioned on said seat, resilient means reacting against said ball normally to retain the latter on said seat, said valve seat being interposed between said first passageway and said discharge port and an actuating member comprising a rod is provided having one end adapted to abut against said ball and a piston mounted on its other end and means to apply a source of fluid under pressure against said piston to move said actuating rod against said ball valve.

* * * * *